(12) United States Patent
Weiershausen

(10) Patent No.: US 8,083,037 B2
(45) Date of Patent: Dec. 27, 2011

(54) BRAKE DISK LOCK

(75) Inventor: Bernd Weiershausen, Rehe (DE)

(73) Assignee: ABUS August Bremicker Soehne KG, Wetter-Volmarstein (DE)

( * ) Notice: Subject to any disclaimer, the term of this patent is extended or adjusted under 35 U.S.C. 154(b) by 622 days.

(21) Appl. No.: 12/328,835

(22) Filed: Dec. 5, 2008

(65) Prior Publication Data

US 2009/0145704 A1    Jun. 11, 2009

(30) Foreign Application Priority Data

Dec. 5, 2007  (DE) .......................... 10 2007 058 551

(51) Int. Cl.
*F16D 69/00* (2006.01)
(52) U.S. Cl. ............................. 188/265; 188/17; 70/228
(58) Field of Classification Search .................. 188/265, 188/31, 69, 17, 18 R, 18 A; 70/33, 226–228, 70/233
See application file for complete search history.

(56) References Cited

U.S. PATENT DOCUMENTS

| | | | | |
|---|---|---|---|---|
| 5,530,427 A | * | 6/1996 | Shieh | 340/542 |
| 5,823,025 A | * | 10/1998 | Phifer | 70/226 |
| 7,467,530 B2 | * | 12/2008 | Torrado et al. | 70/33 |
| 2005/0103584 A1 | * | 5/2005 | Hogesta | 188/265 |
| 2008/0053766 A1 | * | 3/2008 | Costa | 188/344 |
| 2009/0173117 A1 | * | 7/2009 | Xavier et al. | 70/228 |

FOREIGN PATENT DOCUMENTS

| | | |
|---|---|---|
| DE | 92 10 554 U1 | 1/1995 |
| DE | 94 19 272 U1 | 1/1995 |
| DE | 10 2005 043 926 A1 | 3/2007 |
| DE | 10 2005 043 927 A1 | 3/2007 |
| EP | 1 001 121 A1 | 5/2000 |
| WO | WO-2007/010580 A1 | 1/2007 |

OTHER PUBLICATIONS

German Search Report dated Jun. 16, 2008. DE 10 2007 058 551.0.

* cited by examiner

*Primary Examiner* — Melanie Torres Williams
(74) *Attorney, Agent, or Firm* — Gifford, Krass, Spinkle, Anderson & Citkowski, P.C.

(57) ABSTRACT

The invention relates to a brake disk lock having an actuable housing shell, a support section, an engagement hoop and a securing section, with the support section and the engagement hoop bounding a receiving gap for the receiving of a brake disk, with the housing shell being arranged on the same side as the support section with respect to the receiving gap and being movably supported at the support section and with the housing shell, the support section and the securing section cooperating with one another such that the housing shell is movable from a release position into a securing position by a movement of the housing shell relative to the support section in the direction of the receiving gap in order to close the receiving gap by means of the securing section.

17 Claims, 11 Drawing Sheets

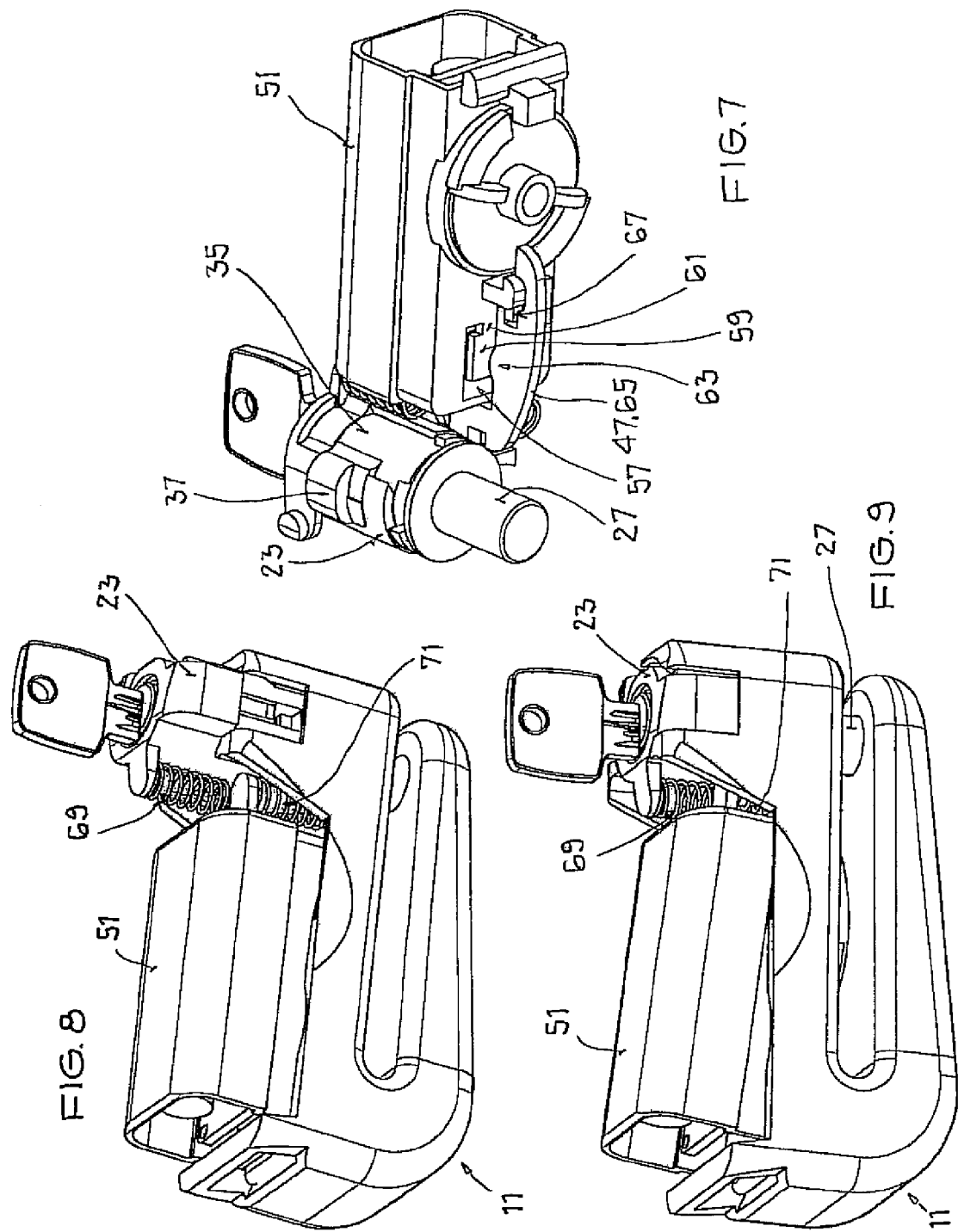

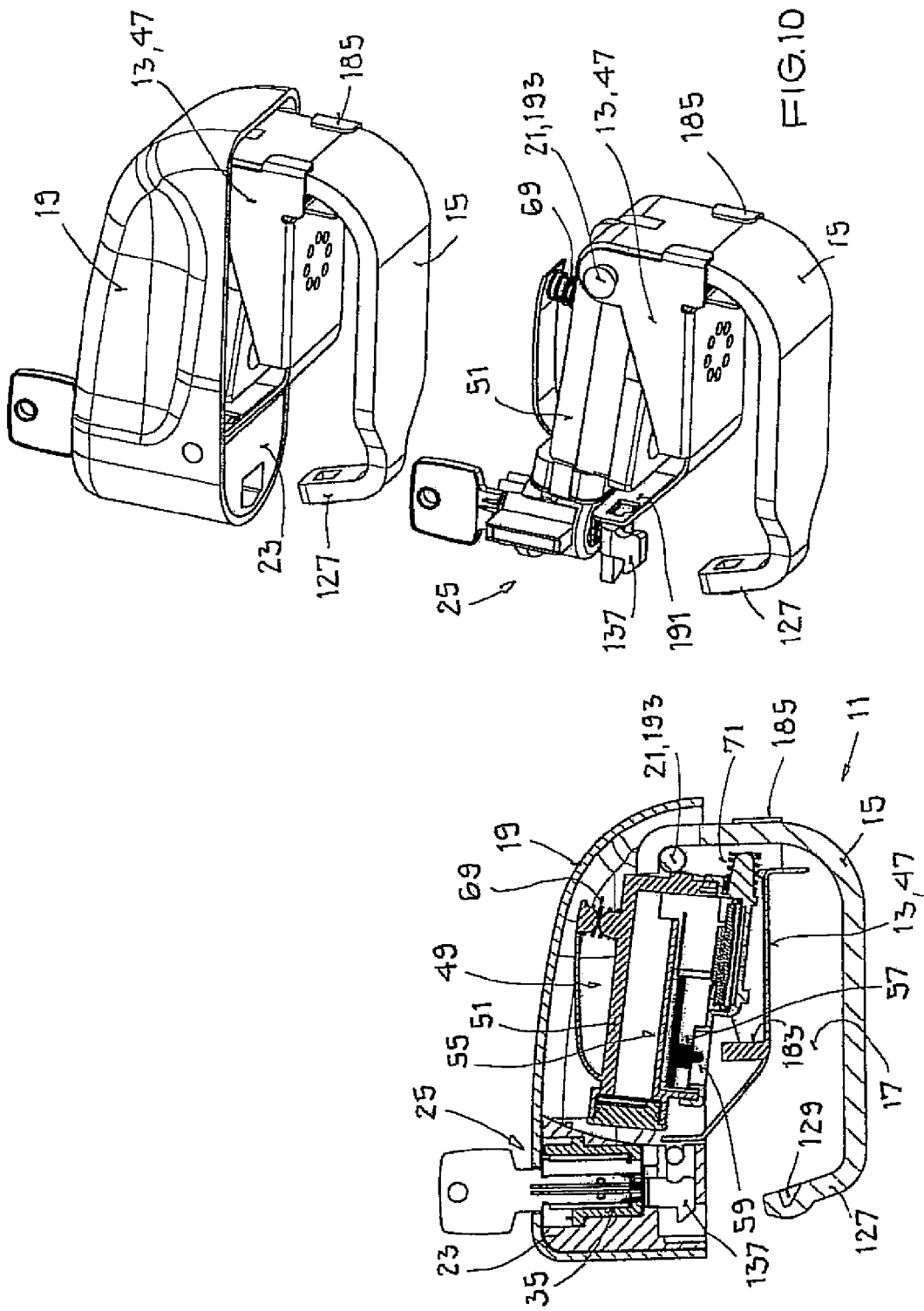

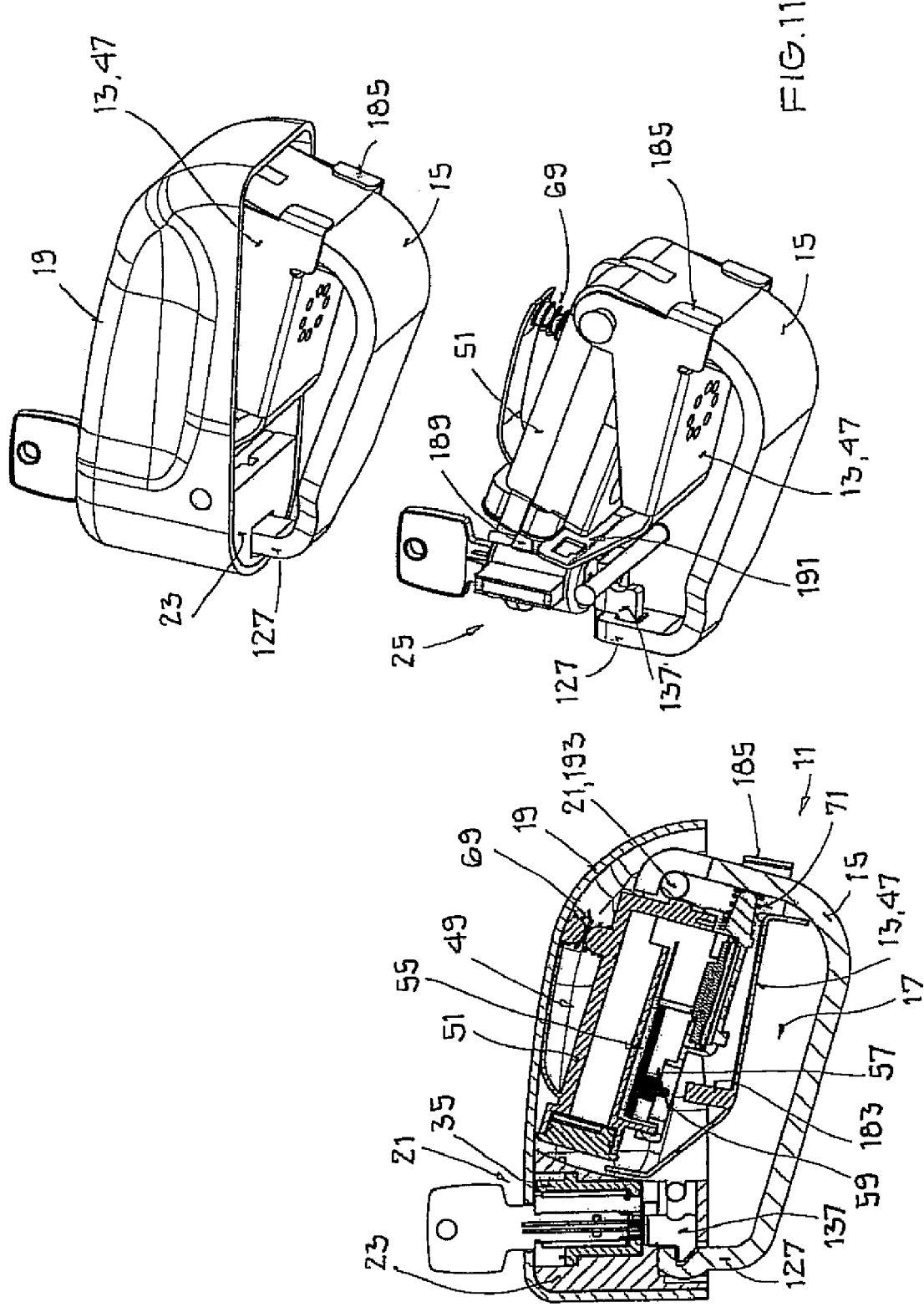

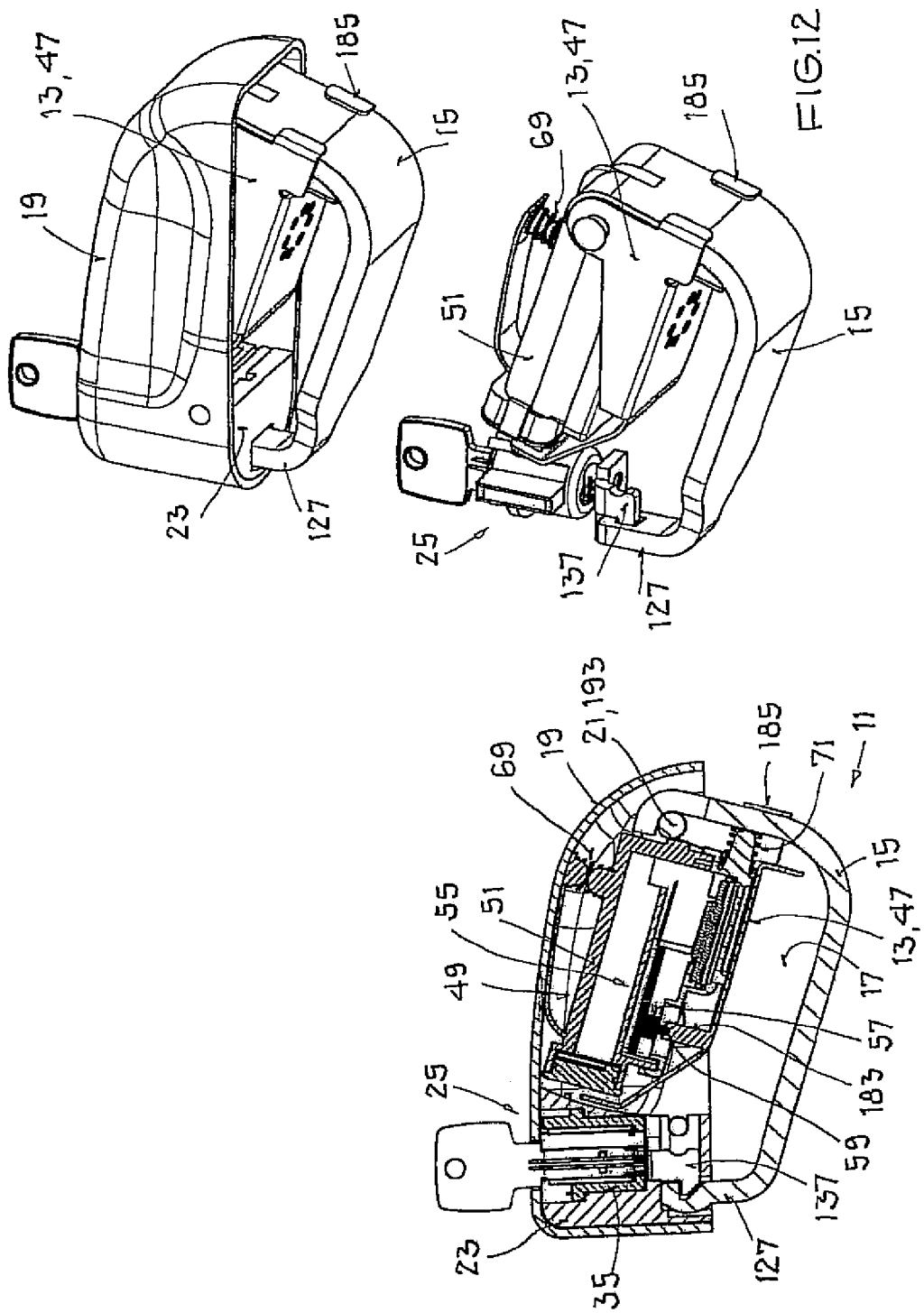

BRAKE DISK LOCK

CROSS-REFERENCE TO RELATED APPLICATIONS

This application claims priority of German Patent Application No. 10 2007 058 551.0 filed Dec. 5, 2007, which is incorporated herein by reference.

FIELD OF THE INVENTION

The present invention relates to a brake disk lock having a receiving gap for the receiving of a brake disk and having a securing section for the closing of the receiving gap.

BACKGROUND OF THE INVENTION

Such a brake disk lock serves for the securing of, for example, a motorcycle, a motor scooter or a quad bike against unauthorized use. For this purpose, the lock is placed onto a brake disk of the parked vehicle such that the brake disk projects into the receiving gap. The securing section is thereupon moved by actuation of the lock into a position in which the securing section traverses the receiving gap and is in this respect guided through an opening of the brake disk. The securing section is latched in this position. The lock is hereby closed at the brake disk and the use of the vehicle is prevented until the lock is again released from the brake disk.

A brake disk lock of the initially named kind is shown in DE 10 2005 043 926 A1 in which the securing section is made as a latch section of a striker pin. To be able to place the lock onto a brake disk, the striker pin is first located in a release position. In this release position, an upper side of the striker pin projects out of an upper side of an upper housing section of the lock. Starting from this release position, the striker pin is moved downwardly along its longitudinal axis to close the receiving gap by the latch section. The downwardly moved striker pin is then rotated around its longitudinal axis to latch the lock. To release the lock for a removal from the brake disk, the striker pin is first turned back again and subsequently the striker pin is retracted axially upwardly.

The handling of the brake disk lock of DE 10 2005 043 926 A1 is, however, comparatively complex since the lock has to be held with the one hand and the striker pin has to be moved axially and turned around its longitudinal axis with the other hand.

SUMMARY OF THE INVENTION

It is the object of the invention to provide a brake disk lock of the initially named kind which has a simplified handling capability.

This object is satisfied by a brake disk lock having the features of claim 1 and in particular by a brake disk lock having an actuable housing shell, a support section, an engagement hoop and a securing section, with the support section and the engagement hoop bounding a receiving gap for the receiving of a brake disk, with the housing shell being arranged on the same side as the support section with respect to the receiving gap and being movably supported at the support section and with the housing shell, the support section and the securing section cooperating with one another such that the housing shell is movable from a release position into a securing position by a movement of the housing shell relative to the support section in the direction of the receiving gap in order to close the receiving gap by means of the securing section.

The brake disk lock in accordance with the invention therefore has a support section. The brake disk lock can be pressed toward a brake disk via the support section. The engagement hoop engages behind the brake disk so that the brake disk is received in the receiving gap formed by the support section and the engagement hoop. The housing shell is movably supported at the support section and can be moved relative to the support section. When the brake disk lock is pressed onto the received brake disk, the housing shell located on the same side as the support section with respect to the brake disk can be moved from the release position in the direction of the receiving gap, whereby a closing of the receiving gap by the securing section of the lock is achieved. The pressing of the brake disk lock toward the brake disk for the closing of the receiving gap can be carried out with only one hand and thus particularly simply by the provision of the actuating means in the form of a housing shell.

A housing shell is to be understood in connection with the invention as an outer housing part which covers other parts of the brake disk lock at least regionally or covers them from a plurality of sides. The housing shell can in particular be a partly open hollow body which surrounds other parts of the brake disk lock at least regionally.

In accordance with an embodiment of the invention, the housing shell is pivotably supported at the support section. The brake disk lock can then be operated in the manner of a standard office stapler (or staple gun). A bolt or a rivet can serve as the pivot axis, for example, which is pushed through corresponding bores in the housing shell and in the support section. The pivot axis can, however, also be formed by any other pivotable support, in particular without a shaft.

The housing shell can be prestressed in the direction of the release position relative to the support section and/or the engagement hoop. This facilitates the removal of a brake disk lock attached to a brake disk since the user of the brake disk lock then does not actively have to ensure that the securing section releases the receiving gap again, but this is rather ensured automatically by the prestressing of the housing shell, for example by means of at least one compression spring which is received inside the housing shell and presses against an inner wall of the housing shell. The simple handling capability of the brake disk lock is thereby improved even further.

In accordance with an optional further development, a braking disk recognition device, which in particular corresponds to the support section of the lock, and/or an alarm device having a motion sensor can be at least partly received in the housing shell in the release position and/or in the securing position. A motion sensor is to be understood as a sensor which detects an acceleration, a vibration, a positional change or any other movement of the lock. If the motion sensor detects such a movement, the alarm device—provided it is activated—outputs an acoustic and/or a visual alarm signal. This alarm function serves, on the one band, to remind the authorized user of the vehicle as necessary before setting off that the lock is still located at the brake disk. On the other hand, the alarm device also satisfies a theft alarm function since break-open attempts are necessarily associated with a certain movement or vibration of the brake disk lock. The alarm signal is preferably not triggered immediately on a movement of the brake disk lock to give the authorized user sufficient time to apply and remove the brake disk lock from the brake disk. To activate and deactivate the alarm device automatically, a brake disk recognition device can be provided which checks whether a brake disk is currently in the brake disk receiver, with the alarm device being activated if this is the case and with the alarm device otherwise being deactivated.

In accordance with another aspect of the invention, a latch is provided, with the securing section being latched by means of the latch (e.g. by an automatic function) or being latchable (e.g. by an actuation by a user) in the securing position of the housing shell—i.e. when the receiving gap is closed by means of the securing section. An unauthorized release of the receiving gap is prevented by the latching of the securing section. The latch can, for example, be actuated via a lock cylinder of the lock, in particular via a catch device drive-operatively connected to the lock cylinder. The latch can be made separately from the catch device or in one piece with it. Optionally, the latch—at least indirectly—simultaneously brings about a latching of the housing shell in the securing position so that the latch holds the housing shell in the pressed-down position while the securing section (e.g. striker pin) closes the receiving gap.

The latch is preferably arranged within the housing shell. The latch is well protected against a break-open attempt by the reception in the housing shell since the housing shell can act as a shielding toward the outside. Alternatively or additionally to the latch, a lock cylinder can also be provided within the housing shell, in particular in an inner housing received in the housing shell. The inner housing can provide further protection. Furthermore, a secure support and/or fastening of the lock cylinder within the housing shell can be ensured in a simple manner by means of the inner housing.

The latch is, for example, movable between an unlatching deflected position and a latching rest position by actuation of the lock cylinder. The latch can, however also be movable into the latching rest position on the basis of an automatic function. The automatic function is in particular characterized in that, on the movement of the housing shell into the securing position, the latch is automatically moved into the latching position, optionally after a previous deflection from the latching rest position in the direction of the unlatching deflected position, without an actuation of the lock cylinder being required for this. The latch can be prestressed into the latching rest position for the realization of the automatic function. In the unlatching deflected position, the housing shell can be moved from the securing position into the release position, whereas such a movement of the housing shell is inhibited in the latching rest position.

In accordance with a further embodiment of the invention, the latch and/or the lock cylinder is supported axially fixedly with respect to the axis of rotation of the lock cylinder within the housing shell, in particular in an inner housing received in the housing shell. The latch or the lock cylinder can then each only carry out a rotary movement and/or a translatory movement in a plane perpendicular to the axis of rotation of the lock cylinder. Provided that the cylinder housing of the lock cylinder is rigidly and/or fixedly connected to the housing shell, in particular via an inner housing, it can hereby achieved that the latch and/or the lock cylinder carries out the same movement as the housing shell on the movement of the housing shell.

The housing shell can be made as a handle which surrounds at least a part of the support section in the release position and/or in the securing position. In the embodiment as a handle, the housing shell can be grasped and actuated by one hand of the user.

The support section and the engagement hoop, or at least a part thereof, can be made in one piece and/or can be rigidly connected to one another. Alternatively to this, the engagement hoop can be supported pivotably, in particular restrictedly pivotable, at the support section. The engagement hoop, the housing shell and the support section can in this case also have a common pivot axis.

Provided that the engagement hoop is pivotably supported at the support section and the support section includes catch means, a corresponding movement of the engagement hoop relative to the housing shell can be brought about on the movement of the housing shell relative to the support section in order to close the receiving gap by the securing section.

In all cases, the support section and the engagement hoop can form a U-shaped arrangement for the receiving gap.

The securing section can be made as a striker pin which is drive-operatively coupled to the housing shell in the axial direction, in particular via an inner housing received in the housing shell. The striker pin can hereby be moved into the receiving gap to close it on the movement of the housing shell into the securing position. The striker pin can then engage into a cut-out formed in the engagement hoop. Alternatively, the securing section can be provided at the free end of the engagement hoop, can in particular be made in one piece thereat. The free end of the engagement hoop can then cooperate, for example, with a latch arranged inside the housing shell in the securing position.

Further embodiments of the invention are described in the dependent claims.

BRIEF DESCRIPTION OF THE DRAWINGS

The invention will be described in the following with reference to two embodiments and to the drawing. In which are shown:

FIG. 7 the brake disk lock of FIG. 1, with a latch which is in its unlatching deflected position, with the housing shell and a lock body of the brake disk lock being omitted with respect to FIG. 1, in a perspective view;

FIG. 8 the brake disk lock of FIG. 1, with two compression springs, with the housing shell being omitted with respect to FIG. 1, in a perspective view;

FIG. 9 the brake disk lock of FIG. 1, with two compression springs, with the housing shell being omitted with respect to FIG. 1, in a perspective view;

FIG. 10 a brake disk lock in accordance with the invention in accordance with a second embodiment of the invention, with a housing shell and a pressure switch, with the housing shell being located in a release position and the pressure switch being unactuated, in different views;

FIG. 11 the brake disk lock of FIG. 10, with the housing shell being located in a securing position and the pressure switch being unactuated, in different views;

FIG. 12 the brake disk lock of FIG. 10, with the housing shell being located in a securing position and the pressure switch being unactuated, in different views;

DETAILED DESCRIPTION OF THE PREFERRED EMBODIMENTS

The brake disk lock shown in FIGS. 1 to 9 in accordance with a first embodiment of the invention has a lock body 11 with a substantially U-shaped structure. The one limb of this U shape forms a support section 13 with which the brake disk lock can be pressed toward a brake disk, not shown, of a motorcycle or the lice, and the other U limb forms an engagement hoop 15. The support section 13 and the engagement hoop 15 extend substantially parallel to one another and they bound a receiving gap 17 for the receiving of the aforesaid brake disk. The support section 13 and the engagement hoop 15 are made in one piece in this respect.

Figure 1:
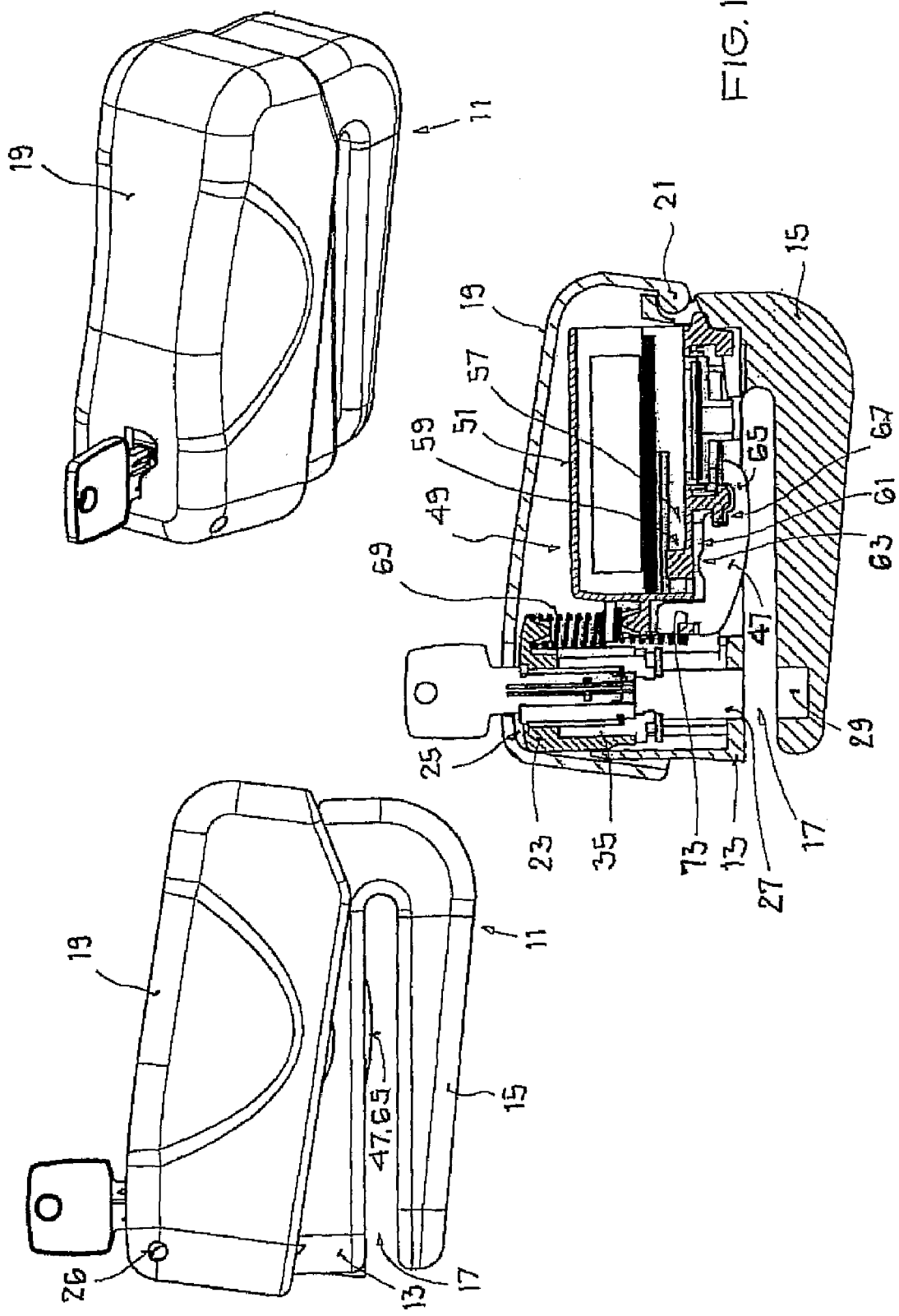
FIG. 1 a brake disk lock in accordance with the invention in accordance with a first embodiment of the invention, with a housing shell and a pressure switch, with the housing shell being located in a release position and the pressure switch being unactuated, in different views.
Figure 2:
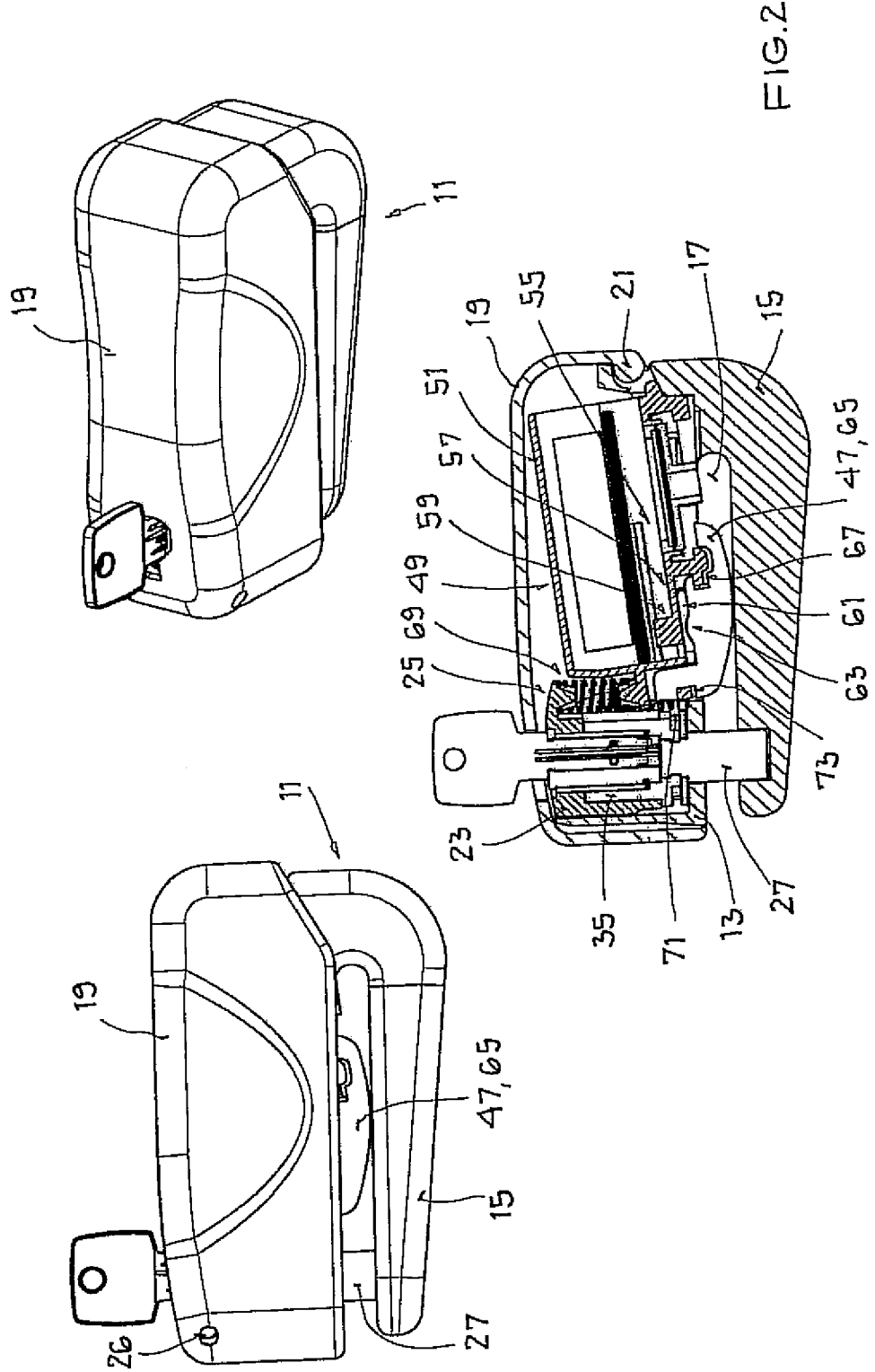
FIG. 2 the brake disk lock of FIG. 1, with the housing shell being located in a securing position and the pressure switch being unactuated, in different views.
Figure 3:
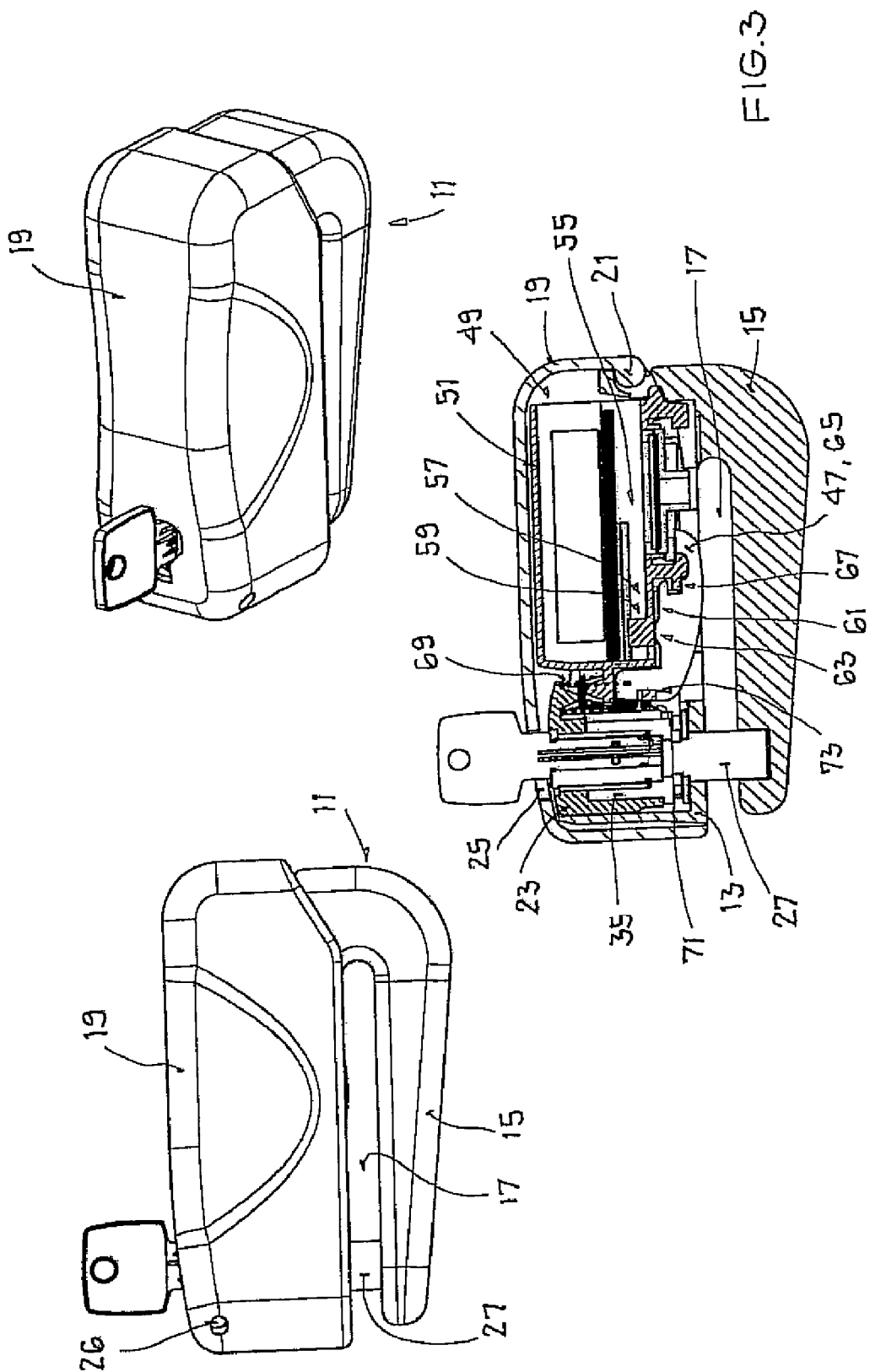
FIG. 3 the brake disk lock of FIG. 1, with the housing shell being located in a securing position and the pressure switch being actuated, in different views.

Furthermore, the brake disk lock includes an actuation section which is made as an actuable housing shell 19 which acts as a handle for a user of the brake disk lock. The housing shell 19 and the engagement hoop 15 are arranged on different sides with respect to the receiving gap 17. The housing shell 19, which is therefore located on the same side as the support section 13, is pivotably supported at the support section 13. The housing shell 19 can therefore be pivoted relative to the lock body 11 from a release position (FIG. 1) around a pivot axis 21 into a securing position (FIGS. 2, 3). The support section 13 is partly received in the housing shell 19 in the release position and is completely received in the housing shell in the securing position.

The free pivot end of the housing shell 19 surrounds an inner housing 23 in which a lock cylinder 25 is in turn received. The inner housing 23 is displaceably supported within the support section 13 and is pivotally connected to the housing shell 19 by means of a holding pin 26. The lock cylinder 25 is supported axially fixedly with respect to its axis of rotation within the inner housing 23. In the axial extension of the lock cylinder 25, a securing section of the lock is provided which is made as a striker pin 27 here. The striker pin 27 which projects out of the housing shell 19 and faces in the direction of the receiving gap 17 in the release position is provided to close the receiving gap 17, which is in open FIG. 1, in the securing position (FIGS. 2, 3). The striker pin 27 is connected to the housing shell 19 via the inner housing 23.

If the housing shell 19 is moved or pivoted relative to the support section 13 from the release position (FIG. 1) in the direction of the receiving gap 17 into the securing position (FIGS. 2, 3), the striker pin 27 is simultaneously also urged in the direction of the receiving gap 17 and is moved through it to close it in a closing position. In the closing position, the striker pin 27 engages into a cut-out 29 formed in the engagement hoop 15. A particular advantage of the lock shown thus consists of the fact that the receiving gap 17 is closed by means of the striker pin 27 solely by pressing the housing shell 19 toward the support section 13 being supported at the brake disk. Provided that additionally the automatic function which will be explained in the following is realized, the lock is simultaneously secured at the brake disk by the pressing movement of the housing shell. The handling of the lock is thus particularly simple.

Figure 4:
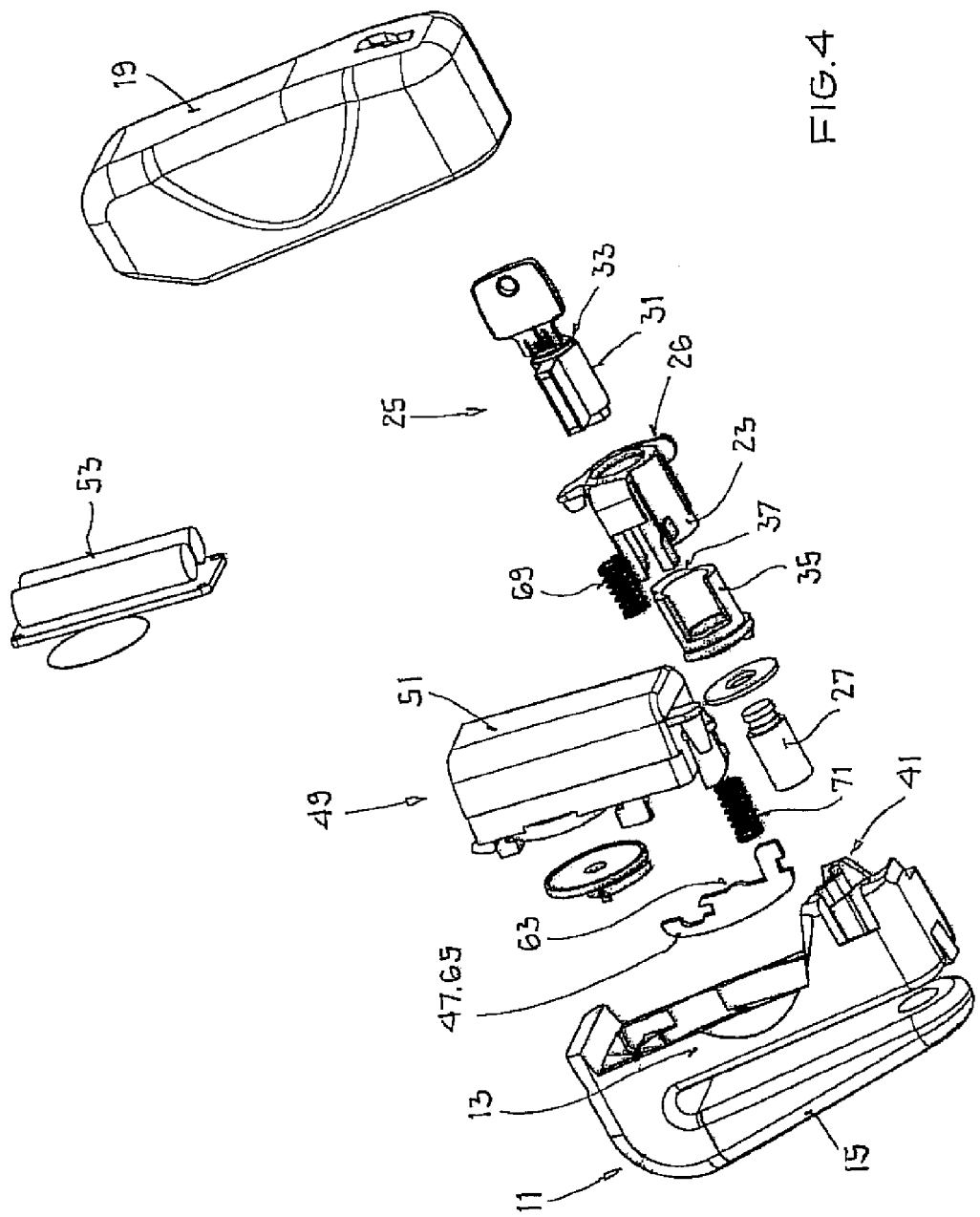
FIG. 4 the brake disk lock of FIG. 1, in an exploded view.
Figure 5:
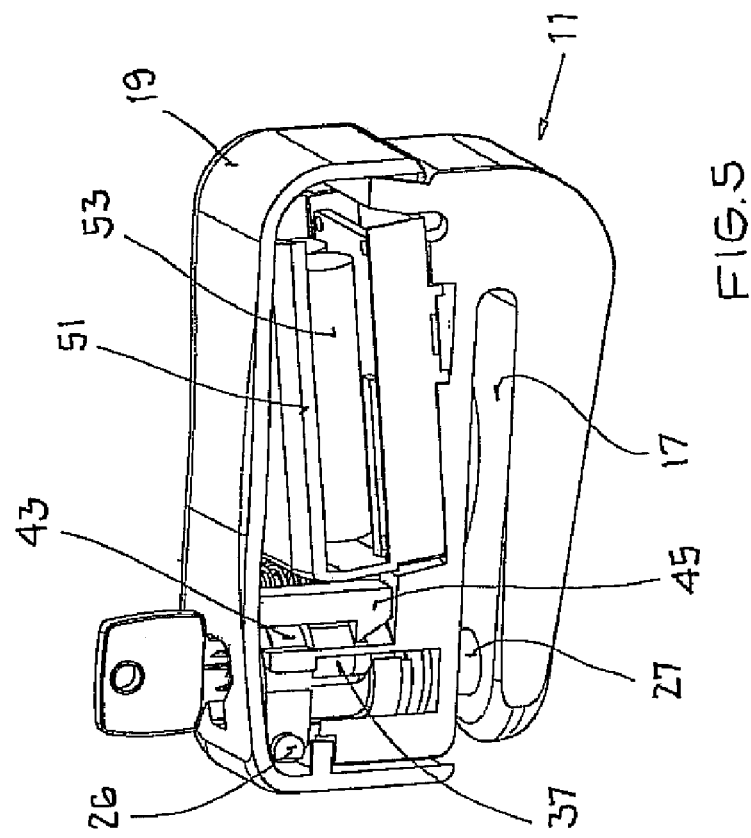
FIG. 5 the brake disk lock of FIG. 1, with a latch which is in a latching rest position, in a cross-sectional view.
Figure 6:
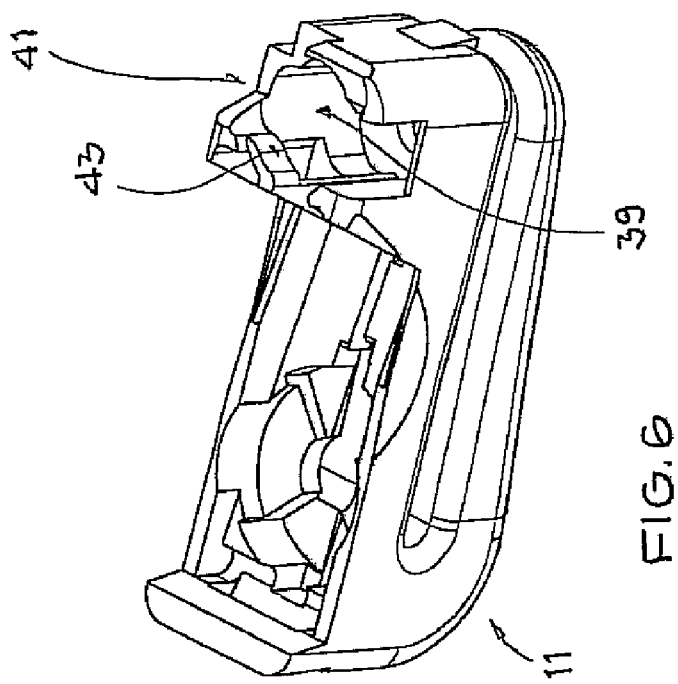
FIG. 6 a lock body of the brake disk lock of FIG. 1, in a perspective view.
Figure 13:
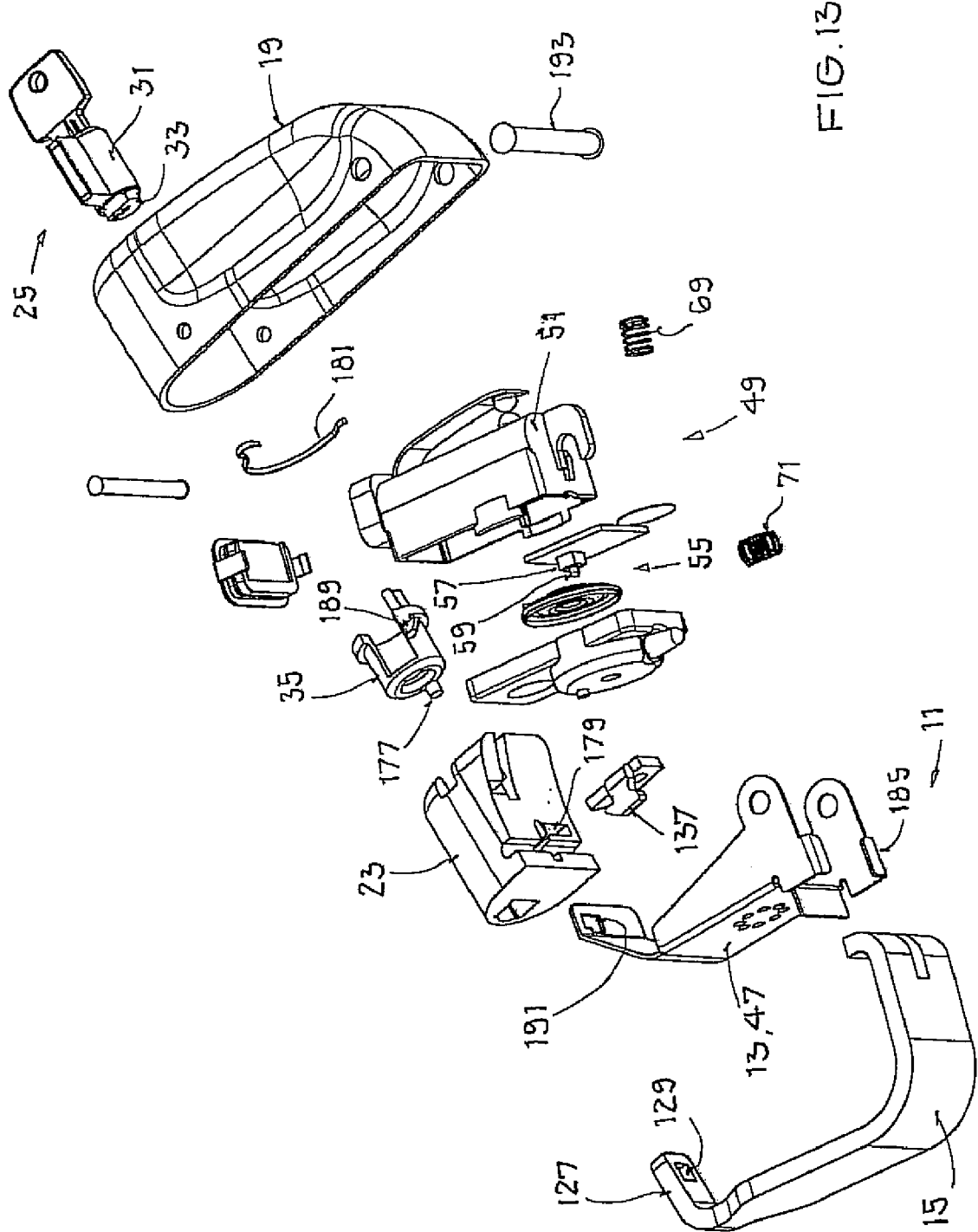
FIG. 13 the brake disk lock of FIG. 10, in an exploded view.
Figure 14:
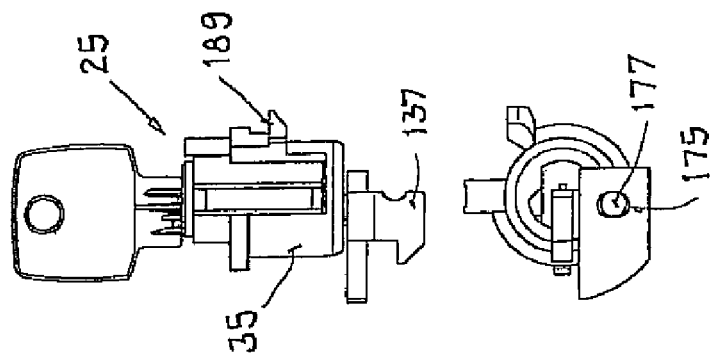
FIG. 14 a lock cylinder, a catch and a latch of the brake disk lock of FIG. 10, with the latch being located in a latching rest position, in different views.

The lock cylinder 25 includes a cylinder housing 31 and a cylinder core 33 arranged rotationally movably within the cylinder housing 31 (FIG. 4). The cylinder housing 31 is fixedly connected to the inner housing 23. The cylinder core 33 is drive-operatively connected to a rotationally movable, axially fixedly supported catch 35 at which a latch 37 is shaped in one piece (FIG. 5). The catch 35 and the latch 37 are likewise received within the housing shell 19. The striker pin 27 first has a neck at its end facing the catch 35 and adjoining it a head projecting radially outwardly over the neck. The catch 35 is in turn made laterally open at its end facing the striker pin 27 (FIG. 7) and has at this end a partly peripheral inwardly projecting shoulder to hold the head of the striker pin 27 and thus the total striker pin 27 at the catch 35.

The catch 35 and thus the latch 37 are prestressed in a latching rest position (FIG. 5), whereby an automatic function is realized which is made possible by a coupling only rotationally fixed in one direction of rotation between a catch section of the cylinder core 33 and the catch 35. A bent rotary catch spring not shown here is provided for the realization of the prestress, such as will be described in the following in connection with a second embodiment of the invention. The named rest position can, however, only be adopted in the securing position of the housing shell 19. The catch 35, which is axially fixedly coupled to the housing shell 19, has compulsory guidance outside the securing position, namely in a groove 39 (FIG. 6) which is made in a receiver 41 of the support section 13 provided in the region of the free pivot end of the housing shell 19 for the inner housing 23, for the lock cylinder 25 and for the striker pin 27. This groove 39 prevents a rotary movement of the catch 35 as long as it has not been moved axially toward the lower end of the groove 39—that is in the direction of the receiving gap 17—by a corresponding actuation of the housing shell 19.

In the rest position, the latch 37 engages between an internally protruding projection 43 of the receiver 41 of the support section 13, on the one hand, and a hook-shaped holding arm 45, on the other hand, whose other end is fastened to an inner side of the housing shell 19 (FIG. 5). In the rest position of the latch 37, the striker pin 27 is thus latched, i.e. the striker pin 27 is secured against an axial movement from the aforesaid closing position since is contacts the axially latched catch 35 at the upper side. At the same time, the holding arm 45 prevents the housing shell 19 from moving back into the release position.

To move the latch 37 from its latching rest position into an unlatching deflected position (FIG. 7), the latch 37 is rotated against the prestress by a corresponding rotary actuation of the cylinder core 33 of the lock cylinder 25 by means of an associated key in the direction of the groove 39 which enables an axial movement of the catch 35 along the receiver 41 of the support section 13. The striker pin 27 contacting the lower side of the catch 35 can thus now move out of the receiving gap 27 and the housing shell 19 can now pivot back from the securing position into the release position.

A purely translatory movement of the housing shell 19 can naturally also be provided instead of the explained pivot movement.

The housing shell 19 surrounds a brake disk recognition device 47 of the brake disk lock in the securing position, provided that a brake disk is received in the receiving gap 17 in the securing position (FIG. 3). The brake disk recognition device 47 is provided to detect whether a brake disk is located in the receiving gap 17. Furthermore, the housing shell 19 surrounds an alarm device 49 for the output of an alarm signal both in the release position and in the securing position. The alarm device 49 includes a motion sensor, not shown, a control board, not drawn, an alarm output device, not shown, for example a loudspeaker, and a housing 51 for at least one battery 53 (FIG. 5), for the motion sensor and for the control board.

In addition, a pressure switch 55 is provided which is likewise received in the housing shell 19. The pressure switch 55 includes a switch body 57 which is rigidly fastened to the housing 51 of the alarm device 49 and a contact element 59 which is movable by the brake disk recognition device 47 against the spring force of a first spring means 61 and relative to the switch body 57 to activate the alarm device 49. The first spring means 61 is here made as a bending beam or alternatively, for example, as a compression spring included in the pressure switch 55, said bending beam or said compression spring acting between the switch body 57 and the contact element 59. A pressure switch is generally a switch which is actuated by pressing against a force, in particular against a mechanical spring tension, to establish an electrical contact.

The brake disk recognition device 47 is held at the switch body 57 via a pivot point 67 and it includes a switch plate 65 with an arched neck 63 which acts as a switch rocker. In the release position of the housing shell 19 (FIG. 1) and in the securing position of the housing shell 19, provided no brake disk is received in the receiving gap 17 in the securing position (FIG. 2), the brake disk recognition device 47 with the arched neck 63 of the switch plate 65 is arranged with clearance to the contact element 59 of the pressure switch 55 so that the pressure switch 55 is not actuated in FIGS. 1 and 2. The securing position in accordance with FIG. 2 is provided for the carrying along or transporting of the brake disk lock.

The housing 51 of the alarm device 49 and thus the pressure switch 55 fixedly attached thereto are pivotable both relative to the housing shell 19 and relative to the lock body 11 substantially around the pivot axis 21 of the housing shell 19.

The alarm device 49 and the pressure switch 55 are coupled to the housing shell 19 via a second spring means 69 (FIGS. 8, 9) which is made as a compression spring and has a larger spring constant than the first spring means 61. Furthermore, the alarm device 49 and the pressure switch 55 are coupled to the lock body 11 or its support section 13 via a third spring means 71 (FIGS. 8, 9) which is substantially identical to the second spring means 69. The first spring means 61 and the second spring means 69 act in substantially the same direction. A floating support of the alarm device 49, of the pressure switch 55 and of the brake disk recognition device 47 is achieved between the housing shell 19 and the lock body 11 by the second and third spring means 69, 71.

It is achieved by the second spring means 69 that, on the movement of the housing shell 19 into the securing position (FIGS. 2, 3), the alarm device 49, the pressure switch 55, and thus the brake disk recognition device 47, is moved along. A prestress of the housing shell 19 into the release position and relative to the support section 13 is achieved by the second spring means 69, in particular by the second spring means 69 and the third spring means 71. The alarm device 49, and thus the pressure switch 55, is urged out of the receiving gap 17 by the third spring means 69 so that, in the release position (FIG. 1), the brake disk recognition device 47 held at the switch body 57 is substantially pivoted out of the receiving gap 19. It is thus achieved by the cooperation of the second spring means 69 with the third spring means 71 that the brake disk recognition device 47 is only moved into the receiving gap 17 when the housing shell 19 is pressed in the direction of the support section 13 after a brake disk has been introduced into the receiving gap 17. The brake disk recognition device 47 can thus be made as a simple sheet metal part 65 and does not, for example, have to be made in ball shape, for instance, or with any other particular shape.

The first spring means 61 and the second spring means 69 are matched with respect to one another such that, on the movement of the housing shell 19 from the release position into the securing position, the pressure switch 55 or its contact element 59 is actuated against the spring force of the first spring means 61 in every case, provided that a brake disk is received in the receiving gap 17 (FIG. 3). In this respect, the housing shell 19 moves relative to the brake disk recognition device 47. The clearance present between the brake disk recognition device 47 and the pressure switch 55 in FIGS. 1 and 2 is eliminated in this respect. A remaining relative movement between the housing shell 19 and the brake disk recognition device 47 going beyond this is taken up by the second spring means 69. It is thus achieved by the cooperation of the first spring means 61 and of the second spring mans 69 that a reliable activation of the alarm device 49 is always ensured for brake disks of different thickness.

To avoid any damage to the first spring means 61, an abutment 73 is provided for the brake disk recognition device 47. The spring excursion of the first spring means 61, and thus that part of the relative movement between the housing shell 19 and the brake disk recognition device 47 which is taken up by the first spring means 61, is hereby limited. The spring force exerted by the first spring means 61 is therefore smaller than the spring force exerted by the second spring means 69 in the securing position, provided that a brake disk is received in the receiving gap 17 (FIG. 3).

The brake disk lock in accordance with a second embodiment of the invention shown in FIGS. 10 to 16 substantially corresponds to the brake disk lock in accordance with the first embodiment so that mutually corresponding parts of the two embodiments are provided with the same reference numerals. A repeated presentation of these parts, their function and cooperation with other parts will be omitted and reference is made in this respect to the above description on the brake disk lock in accordance with the first embodiment. Only the differences of the second embodiment with respect to the first embodiment will therefore be explained in the following.

The securing section, which is made as the striker pin 27 in the brake disk lock in accordance with the first embodiment, corresponds in the brake disk lock in accordance with the second embodiment to the bent over free end 127 of the engagement hoop 15. The free end 127 of the engagement hoop 15 has a cut-out 129 into which a latch 137 engages in the securing position of the housing shell 19 to latch the free end 127 of the rear latch hoop 15. The latch 137 is arranged within the housing shell 19 and in an axial extension of the lock cylinder 25.

Figure 15:
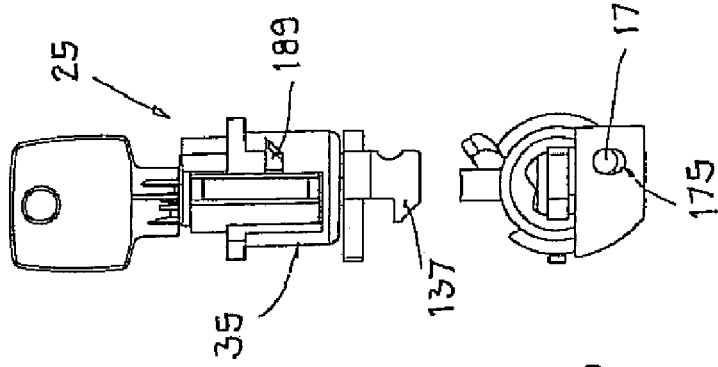
FIG. 15 a lock cylinder, a catch and a latch of the brake disk lock of FIG. 10, with the latch being located in an unlatching deflected position, in different views.
Figure 16:
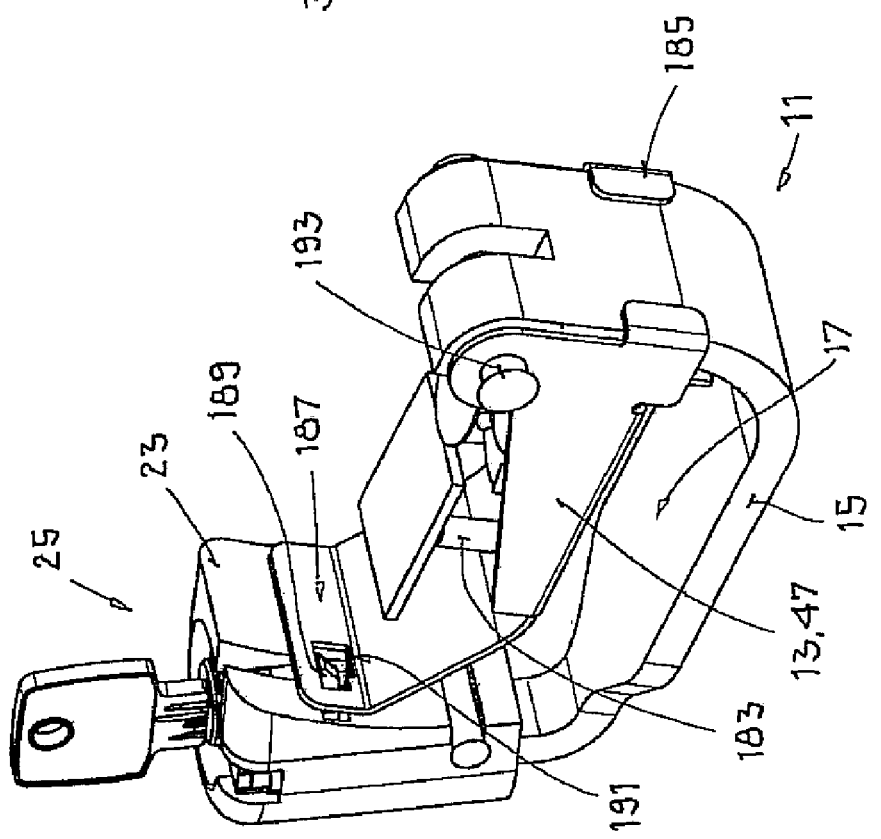
FIG. 16 the brake disk lock of FIG. 10, with a locking mechanism, with parts of the brake disk lock being omitted with respect to FIG. 10.

The latch 137 is coupled via an elongate hole 175 (FIGS. 14, 15) to a catch pin 177 of the catch 35 and has compulsory guidance in a latch guide 179 formed in the inner housing 23 (FIG. 13) so that a rotary movement of the cylinder core 33 of the lock cylinder 25 is converted into a linear movement of the latch 137 perpendicular to the longitudinal axis of the lock cylinder 25, whereby the latch 137 is movable between the latching rest position (FIG. 14) and the unlatching deflected position (FIG. 15). The catch 35 and thus the latch 137 are prestressed via a rotary catch spring 181 (FIG. 13) into the latching rest position to ensure the automatic function.

Furthermore, the lock body 11 of the brake disk lock in accordance with the second embodiment is made in two pieces. The support section 13 and the engagement hoop 15 are supported pivotably with respect to one another, with the support section 13, the engagement hoop 15 and the housing shell 19 having a common pivot axis which is formed by a groove 193, with the groove 193 being pushed through corresponding bores in the housing shell 19 and in the support section 13 in the region of the base of the U-shaped lock body 11. It is made possible by the two-part design of the lock body 11 in the brake disk lock in accordance with the second embodiment that the pressure switch 55 is not actuated in the securing position of the housing shell 19, provided that no brake disk is received in the receiving gap 17 (FIG. 11), since the support section 13 in the brake disk lock in accordance with the second embodiment simultaneously also corresponds to the brake disk recognition device 47.

At its side remote from the receiving gap 17, an actuation pin 183 is shaped at the support section 13 or at the brake disk recognition device 47 or at a sealing surface, not shown, for the alarm device 19, by which actuation pin the pressure switch 55 is actuated when the housing shell 19 is pivoted out of the release position into the securing position, provided that a brake disk is received in the receiving gap 17.

The pressure switch 55 in accordance with the second embodiment is made as a push button in which the contact element 59 is prestressed with respect to the switch body 57 in the direction of a position not actuating the pressure switch 55 by means of an integrated compression spring, not shown, which corresponds to the first spring means, and thus to the bending beam 61 of the first embodiment. This compression spring (as the first spring means) cooperates with a compression spring 69 (as a second spring means) and is matched thereto, as explained in connection with the first embodiment.

Since the pressure switch 55 is rigidly fastened to the housing 51 of the alarm device, which is likewise pivotable around the rivet 193, the support section 13 and the brake disk recognition device 47 and the pressure switch 55 are also pivotable relative to one another. Finally, the housing shell 19, the housing 51, the alarm device 49, the pressure switch 55, the engagement hoop 15 and the support section 13 or the brake disk recognition device 47 are pivotable relative to one another around the common pivot axis 21.

The support section 13 has two catch claws 185 which engage around the section of the engagement hoop 15 directed in the direction of the rivet 193. It is hereby ensured on the movement of the housing shell 19 relative to the support section 13 from the release position into the securing position that the housing shell 19 is moved in a substantially corresponding manner relative to the engagement hoop 15 or vice versa. If the support section 13 is pressed toward the brake disk by pressing the brake disk lock in the direction of the brake disk, the engagement hoop 15 is taken along, whereby the receiving gap 17 is closed. The support section 13 or the brake disk recognition device 47 therefore actuates both the engagement hoop 15 and the pressure switch 55.

The third spring means 71 is—contrary to the case with the brake disk lock in accordance with the first embodiment—not supported at the support section 13, but rather at the engagement hoop 15 so that the housing shell 19 is prestressed in the direction of the release position relative to the engagement hoop 15.

Furthermore, a locking mechanism 187 (FIG. 16) is provided in the brake disk lock in accordance with the second embodiment to hold the actuation pin 138 of the brake disk recognition device 47 in the position actuating the pressure switch 55. For this purpose, a catch nose 189 is formed at the catch 35 and engages in the latching rest position of the latch 137 into a window 191 formed at the free end of the support section 13.

It must still be noted with respect to the two explained embodiments that a compulsory control of the catch 35 effective in both rotary directions by means of the lock cylinder 25 can also be provided instead of an automatic function.

The invention claimed is:

1. A brake disk lock having an actuable housing shell (19), a support section (13), an engagement hoop (15), and a securing section (27, 127), wherein the support section (13) and the engagement hoop (15) bound a receiving gap (17) for the receiving of a brake disk, wherein the housing shell (19) is arranged on the same side as the support section (13) with respect to the receiving gap (17) and is movably supported at the support section (13), and wherein the housing shell (19), the support section (13) and the securing section (27, 127) cooperate such that the housing shell (19) is movable from a release position into a securing position by a movement of the housing shell (19) relative to the support section (13) in the direction of the receiving gap (17) to close the receiving gap (17) by means of the securing section (27, 127).

2. A brake disk lock in accordance with claim 1, characterized in that the housing shell (19) is pivotably supported at the support section (13).

3. A brake disk lock in accordance with claim 1, characterized in that the housing shell (19) is prestressed in the direction of the release position relative to the support section (13) and/or the engagement hoop (15).

4. A brake disk lock in accordance with claim 1, characterized in that a brake disk recognition device (47) and/or an alarm device (49) is at least partly received in the housing shell (19) at least in the release position.

5. A brake disk lock in accordance with claim 1, characterized in that a latch (37, 137) is provided, with the securing section (27, 127) being latched or latchable by means of the latch (37, 137) in the securing position of the housing shell (19).

6. A brake disk lock in accordance with claim 5, characterized in that the housing shell (19) is at the same time latched or latchable in the securing position by means of the latch (37, 137).

7. A brake disk lock in accordance with claim 5, characterized in that a lock cylinder (25) is provided within the housing shell (19), in particular in an inner housing (23) received in the housing shell (19).

8. A brake disk lock in accordance with claim 7, characterized in that the latch (37, 137) is movable into an unlatching deflected position by actuation of the lock cylinder (25); and in that the latch (37, 137) is movable into a latching rest position by actuation of the lock cylinder (25) or on the basis of an automatic function.

9. A brake disk lock in accordance with claim 8, characterized in that the latch (37, 137) is prestressed into the latching rest position.

10. A brake disk lock in accordance with claim 7, characterized in that the latch (37, 137) and/or the lock cylinder (25) is supported axially fixedly within the housing shell (19) with respect to the axis of rotation of the lock cylinder (25), in particular in an inner housing (23) received in the housing shell (19).

11. A brake disk lock in accordance with claim 1, characterized in that the housing shell (19) is made as a handle which surrounds at least a part of the support section (13) in the release position and/or in the securing position.

12. A brake disk lock in accordance with claim 1, characterized in that the support section (13) and at least a part of the engagement hoop (15) are made in one piece and/or are rigidly connected to one another.

13. A brake disk lock in accordance with claim 1, characterized in that the engagement hoop (15) is pivotably supported at the support section (13).

14. A brake disk lock in accordance with claim 13, characterized in that the engagement hoop (15), the housing shell (19) and the support section (13) have a common pivot axis.

15. A brake disk lock in accordance with claim 13, characterized in that the support section (13) includes catch means (185) which, on the movement of the housing shell (19) relative to the support section (13), bring about a corresponding movement of the engagement hoop (15) relative to the housing shell (19) to close the receiving gap (17) by the securing section (27, 127).

16. A brake disk lock in accordance with claim 1, characterized in that the securing section (27, 127) is made as a striker pin (27) which can be driven in the axial direction by the movement of the housing shell (19), in particular via an inner housing (23) received in the housing shell (19).

17. A brake disk lock in accordance with claim 1, characterized in that the securing section (27, 127) is formed at the free end (127) of the engagement hoop (15).

* * * * *